(12) United States Patent
Fujimaki

(10) Patent No.: US 10,191,555 B2
(45) Date of Patent: *Jan. 29, 2019

(54) HEAD-MOUNTED DISPLAY DEVICE, CONTROL METHOD FOR THE HEAD-MOUNTED DISPLAY DEVICE, AND AUTHENTICATION SYSTEM

(71) Applicant: SEIKO EPSON CORPORATION, Tokyo (JP)

(72) Inventor: Yutaka Fujimaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 305 days.

This patent is subject to a terminal disclaimer.

(21) Appl. No.: 15/075,822

(22) Filed: Mar. 21, 2016

(65) Prior Publication Data

US 2016/0202486 A1    Jul. 14, 2016

Related U.S. Application Data

(63) Continuation of application No. 13/975,799, filed on Aug. 26, 2013, now Pat. No. 9,317,126.

(30) Foreign Application Priority Data

Sep. 10, 2012   (JP) ................................ 2012-198349

(51) Int. Cl.
    *G06F 3/01*    (2006.01)
    *G06F 21/31*   (2013.01)
    (Continued)

(52) U.S. Cl.
    CPC ........... *G06F 3/017* (2013.01); *G02B 27/017* (2013.01); *G02B 27/0172* (2013.01);
    (Continued)

(58) Field of Classification Search
    CPC ........ G06F 3/017; G06F 3/0304; G06F 21/36; G02B 27/017; G02B 27/0172; G02B 2027/014; G02B 2027/0138
    See application file for complete search history.

(56) References Cited

U.S. PATENT DOCUMENTS

7,454,717 B2 * 11/2008 Hinckley ............ G06F 3/04883
                                              715/863
8,436,821 B1 *  5/2013 Plichta ................ G06F 3/04883
                                              345/156

(Continued)

FOREIGN PATENT DOCUMENTS

JP    H06314259 A    11/1994
JP    2008-171066 A   7/2008

OTHER PUBLICATIONS

Sakita, Takayuki et al. "Individual certification using the tracks extraction by the fingertip tracking." pp. 1-28.

(Continued)

*Primary Examiner* — Antonio Xavier
(74) *Attorney, Agent, or Firm* — Oliff PLC

(57) ABSTRACT

A head-mounted display device that enables a user to simultaneously visually recognize a virtual image and an outside scene includes a photographing unit configured to photograph at least a part of a visual field direction of the user in a state in which the user wears the head-mounted display device and acquire a motion of the user; a track acquiring unit configured to acquire a track of the motion of the user from the motion photographed by the photographing unit; and an authentication processing unit configured to authenticate, using the track acquired by the track acquiring unit, whether the user is a proper user.

16 Claims, 9 Drawing Sheets

(51) Int. Cl.
    *G02B 27/01*     (2006.01)
    *G06F 21/32*     (2013.01)
    *G06F 3/03*     (2006.01)
    *G06F 21/36*     (2013.01)

(52) U.S. Cl.
    CPC .......... *G06F 3/0304* (2013.01); *G06F 21/316* (2013.01); *G06F 21/32* (2013.01); *G06F 21/36* (2013.01); *G02B 2027/014* (2013.01); *G02B 2027/0138* (2013.01)

(56) References Cited

U.S. PATENT DOCUMENTS

| | | | | |
|---|---|---|---|---|
| 8,615,793 B2* | 12/2013 | Theimer | ................ | G06F 21/46 382/195 |
| 8,902,154 B1* | 12/2014 | Kahn | ................ | G06F 1/1694 345/156 |
| 9,021,270 B1* | 4/2015 | Byers | ................ | H04L 63/0861 713/186 |
| 9,202,105 B1* | 12/2015 | Wang | ................ | G06Q 20/4014 |
| 9,317,126 B2* | 4/2016 | Fujimaki | ................ | G06F 3/017 |
| 2004/0193413 A1* | 9/2004 | Wilson | ................ | G06F 3/017 704/243 |
| 2006/0033713 A1* | 2/2006 | Pryor | ................ | G06F 3/042 345/158 |
| 2006/0284969 A1 | 12/2006 | Kim et al. | | |
| 2009/0232368 A1* | 9/2009 | Niinuma | ................ | G06K 9/00107 382/124 |
| 2010/0013739 A1 | 1/2010 | Sako et al. | | |
| 2011/0221657 A1 | 9/2011 | Haddick et al. | | |
| 2013/0120282 A1* | 5/2013 | Kukulski | ................ | G06F 3/04883 345/173 |
| 2013/0154919 A1* | 6/2013 | Tan | ................ | G01S 15/50 345/156 |

OTHER PUBLICATIONS

Apr. 23, 2015 Non-Final Rejection issued in U.S. Appl. No. 13/975,799.

Oct. 22, 2015 Final Rejection issued in U.S. Appl. No. 13/975,799.

\* cited by examiner

HEAD-MOUNTED DISPLAY DEVICE, CONTROL METHOD FOR THE HEAD-MOUNTED DISPLAY DEVICE, AND AUTHENTICATION SYSTEM

This application is a Continuation of application Ser. No. 13/975,799 filed Aug. 26, 2013, which is based upon and claims the benefit of priority from Japanese Patent Application No. 2012-198349 filed Sep. 10, 2012, the entire contents of the prior applications being incorporated herein by reference.

BACKGROUND

1. Technical Field

The present invention relates to a head-mounted display device and a control method for the head-mounted display device.

2. Related Art

There is known a head-mounted display device (a head mounted display (HMD)), which is a display device worn on the head. For example, the head-mounted display device generates image light, which represents an image, using a liquid crystal display and a light source and guides the generated image light to the eyes of a user using a projection optical system and a light guide plate to thereby cause the user to recognize a virtual image.

In recent years, the HMD has been advanced in high functionality. An HMD having a function equivalent to the function of a personal computer has emerged on the market. In the high-function HMD, personal information and the like are often stored in the HMD. Therefore, improvement of security is demanded in the HMD as in the personal computer. There is known a technique for recognizing whether a user of an HMD is a proper user in order to achieve improvement of security in the HMD. In the following explanation, authenticating whether a user is a proper user is simply referred to as "authenticate" as well. For example, JP-A-6-314259 (Patent Literature 1) describes an HMD that photographs an image of an eye of a user and determines whether the photographed image matches an image registered in advance to thereby perform authentication of the user.

In the technique described in Patent Literature 1, an outsider can impersonate a proper user by acquiring in advance a photograph of an eye of the proper user, for example, a commemorative photograph or an identification photograph.

Therefore, there is a demand for a technique capable of reducing a risk of the impersonation and realizing authentication with further improved security in a head-mounted display device (HMD).

SUMMARY

An advantage of some aspects of the invention is to solve at least a part of the problems described above, and the invention can be implemented as the following aspects.

(1) An aspect of the invention provides a head-mounted display device that enables a user to simultaneously visually recognize a virtual image and an outside scene. The head-mounted display device includes: a photographing unit configured to photograph at least a part of a visual field direction of the user in a state in which the user wears the head-mounted display device and acquire a motion of the user; a track acquiring unit configured to acquire a track of the motion of the user from the motion photographed by the photographing unit; and an authentication processing unit configured to authenticate, using the track acquired by the track acquiring unit, whether the user is a proper user. With the head-mounted display device according to this aspect, the authentication processing unit authenticates, using the track of the motion of the user, whether the user is a proper user. Therefore, compared with authentication performed using a character string or an image, it is difficult to duplicate information used as a key for the authentication. As a result, in the head-mounted display device, it is possible to reduce a risk of impersonation and realize authentication with further improved security.

(2) The head-mounted display device according to the aspect described above may further include a guidance unit configured to inform the user of an overlapping region where a display region of the virtual image and a photographing region of the photographing unit overlap. With the head-mounted display device with this configuration, the guidance unit informs the user of the overlapping region where the display region of the virtual image and the photographing region of the photographing unit overlap. Therefore, the user can learn where the user should perform a motion. As a result, it is possible to improve convenience for the user.

(3) In the head-mounted display device according to the aspect described above, the photographing unit may photograph, after detecting a start trigger set in advance, the motion until the photographing unit detects an end trigger set in advance. With the head-mounted display device with this configuration, the photographing unit photographs, after detecting the start trigger set in advance, the motion until the photographing unit detects the end trigger set in advance. Therefore, the photographing unit can photograph only a track used as the key for the authentication.

(4) In the head-mounted display device according to the aspect described above, at least one of the start trigger and the end trigger may be detection of stillness of the motion of the user for a predetermined time or more. With the head-mounted display device with this configuration, the photographing unit can use, as the start trigger or the end trigger, the detection of the stillness of the motion of the user for the predetermined time or more.

(5) In the head-mounted display device according to the aspect described above, at least one of the start trigger and the end trigger may be detection of passage of the motion of the user in a predetermined position. With the head-mounted display device with this configuration, the photographing unit can use, as the start trigger or the end trigger, the detection of the passage of the motion of the user in the predetermined position.

(6) In the head-mounted display device according to the aspect described above, at least one of the start trigger and the end trigger may be detection of a predetermined shape of a part of the body of the user. With the head-mounted display device with this configuration, the photographing unit can use, as the start trigger or the end trigger, the detection of the predetermined shape of a part of the body of the user.

(7) The head-mounted display device according to the aspect described above may further include a storing unit configured to store a track for authentication, which is the track registered in advance by the proper user of the head-mounted display device. The authentication processing unit may determine that the user is the proper user when similarity between the track acquired by the track acquiring unit and the track for authentication is equal to or higher than a predetermined threshold. With the head-mounted display device with this configuration, the authentication processing unit determines that the user is the proper user when the similarity between the track acquired by the track acquiring unit and the track for authentication is equal to or higher than the predetermined threshold. Therefore, it is possible to realize authentication that allows a fluctuation of the motion of the body.

(8) In the head-mounted display device according to the aspect described above, the authentication processing unit may determine that the user is not the proper user when similarity between the track acquired by the track acquiring unit and a track obtained by converting the track acquired by the track acquiring unit in the past using at least any one method among non-magnification, lateral direction enlargement, longitudinal direction enlargement, lateral direction reduction, and longitudinal direction reduction is equal to or higher than a second threshold larger than the predetermined threshold. With the head-mounted display device with this configuration, the authentication processing unit determines that the user is not the proper user when the similarity between the track acquired by the track acquiring unit and a track obtained by applying a predetermined arithmetic operation to the track acquired by the track acquiring unit in the past is equal to or higher than the second threshold. As a result, it is possible to suppress an act of duplicating a track acquired by the track acquiring unit and used for authentication in the past and impersonating the proper user.

(9) In the head-mounted display device according to the aspect described above, the track acquiring unit may specify the track of the motion according to changes in a moving direction and a movement amount of a part of the body of the user. With the head-mounted display device according to this embodiment, the track acquiring unit can quantitatively specify the track of the motion according to the changes in the moving direction and the movement amount of a part of the body of the user.

(10) In the head-mounted display device according to the aspect described above, the track acquiring unit may specify the track of the motion according to changes in a moving direction and a movement amount of an arbitrary object held by the user. With the head-mounted display device with this configuration, the track acquiring unit can quantitatively specify the track of the motion according to the changes in the moving direction and the movement amount of the arbitrary object held by the user.

(11) In the head-mounted display device according to the aspect described above, the track acquiring unit may set, as a specific point, a part of the body of the user or an arbitrary place of the arbitrary object, repeatedly acquire a position of the specific point at a predetermined time interval, calculate, as the moving direction, the direction of a vector imaginarily connecting the position of the specific point acquired in the n-th acquisition and the position of the specific point acquired in the n+1th acquisition, and calculate, as the movement amount, the magnitude of the vector imaginarily connecting the position of the specific point acquired in the n-th acquisition and the position of the specific point acquired in the n+1th acquisition. With the head-mounted display device with this configuration, the track acquiring unit can calculate a moving direction and a movement amount of a part of the body of the user or the arbitrary object. Therefore, the track acquiring unit can specify a track of the motion according to changes in the moving direction and the movement amount.

(12) Another aspect of the invention provides a control method for a head-mounted display device that enables a user to simultaneously visually recognize a virtual image and an outside scene. The control method includes: (a) photographing at least a part of a visual field direction of the user in a state in which the user wears the head-mounted display device and acquiring a motion of the user; (b) acquiring a track of the motion of the user from the motion photographed in (a); and (c) authenticating, using the track acquired in (b), whether the user is a proper user. With the control method with this configuration, in the head-mounted display device, it is possible to reduce a risk of impersonation and realize authentication with further improved security.

(13) Still another aspect of the invention provides an authentication system. The authentication system includes: a head-mounted display device that enables a user to simultaneously visually recognize a virtual image and an outside scene; and an authentication server that performs authentication of the user. The head-mounted display device includes: a photographing unit configured to photograph at least a part of a visual field direction of the user in a state in which the user wears the head-mounted display device and acquire a motion of the user; and a transmitting unit configured to transmit the motion acquired by the photographing unit to the authentication server. The authentication server includes: a track acquiring unit configured to acquire a track of the motion of the user from the motion received from the head-mounted display device; an authentication processing unit configured to authenticate, using the track acquired by the track acquiring unit, whether the user is a proper user; and a transmitting unit configured to transmit a result of the authentication by the authentication processing unit to the head-mounted display device. With the authentication system with this configuration, the head-mounted display device only has to include a function of photographing at least a part of the visual field direction of the user and photographing the motion of the user and a transmitting function. The authentication server acquires the track of the motion of the user from the received motion and authenticates the user using the track. Therefore, even with a head-mounted display device having a simple configuration, it is possible to reduce a risk of impersonation and realize authentication with further improved security.

(14) In the authentication system according to the aspect described above, the authentication server may further include a function providing unit configured to provide a predetermined function. The function providing unit may limit the provision of the predetermined function to the user until the authentication processing unit determines that the user is the proper user. With the authentication system with this configuration, the function providing unit limits the provision of the predetermined function to the user until the authentication processing unit determines that the user is the proper user. Therefore, it is possible to suppress the predetermined function provided by the authentication server from being used by an unauthorized user.

Not all of the plurality of constituent elements included in the aspects of the invention explained above are essential. In order to solve a part or all of the problems explained above or in order to attain a part or all of effects described in this specification, concerning a part of the plurality of constituent elements, it is possible to perform change, deletion, replacement with a new constituent element, and deletion of a part of limited contents. In order to solve a part or all of the problems explained above or in order to attain a part or all of the effects described in this specification, a part of all of the technical features included in an aspect of the invention explained above can be combined with a part or all of the technical features included in the other aspects of the invention to obtain an independent aspect of the invention.

For example, an aspect of the invention can be realized as a device including a part or all of the three elements, i.e., the photographing unit, the track acquiring unit, and the authentication processing unit. That is, the device may include the photographing unit or does not have to include the photographing unit. The device may include the track acquiring unit or does not have to include the track acquiring unit. The device may include the authentication processing unit or does not have to include the authentication processing unit. Such a device can be realized as, for example, the head-mounted display device. However, the device can also be realized as devices other than the head-mounted display device. A part or all of the technical features of the aspects of the head-mounted display device explained above can be applied to all the devices.

An aspect of the invention can be realized in various forms. An aspect of the invention can be realized as forms of, for example, a head-mounted display device, a control method for the head-mounted display device, an authentication system, a computer program for realizing functions of the method, the device, or the system, and a recording medium having the computer program recorded therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of a Head-Mounted Display Device

Figure 1:
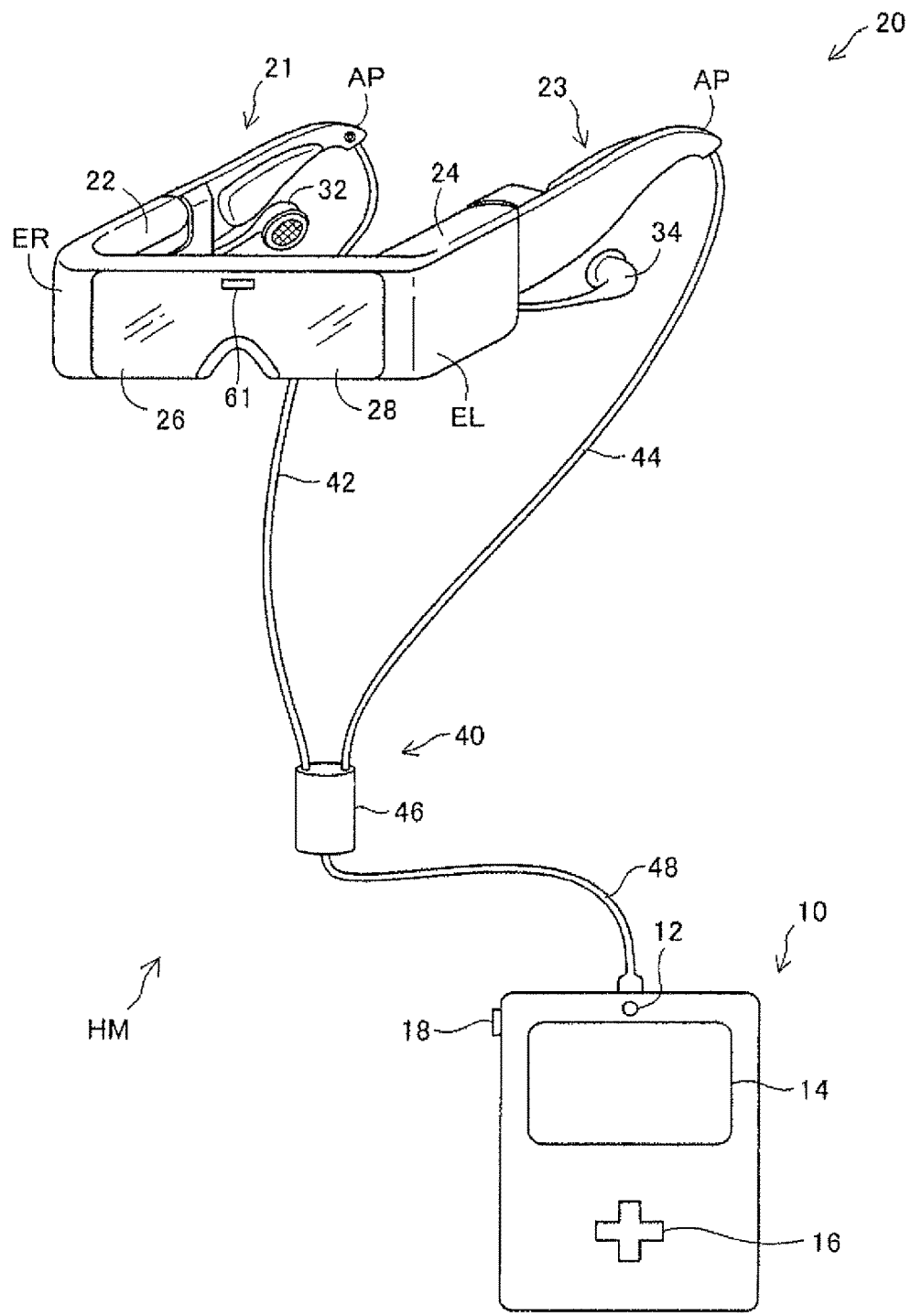
FIG. 1 is an explanatory diagram showing the configuration of the external appearance of a head-mounted display device in an embodiment of the invention.

FIG. 1 is an explanatory diagram showing the configuration of the external appearance of a head-mounted display device in an embodiment of the invention. A head-mounted display device HM is a head-mounted display device worn on the head and is referred to as head mounted display (HMD) as well. The head mounted display HM in this embodiment is a head-mounted display device of an optical transmission type that enables a user to visually recognize a virtual image and, at the same time, directly visually recognize an outside scene.

The head mounted display HM includes an image display unit 20 configured to cause the user to visually recognize a virtual image in a state in which the head mounted display HM is worn on the head of the user and a control unit (a controller) 10 configured to control the image display unit 20.

The image display unit 20 is a wearing body worn on the head of the user. In this embodiment, the image display unit 20 has an eyeglass shape. The image display unit 20 includes a right holding unit 21, a right display driving unit 22, a left holding unit 23, a left display driving unit 24, a right optical-image display unit 26, a left optical-image display unit 28, and a camera 61.

The right optical-image display unit 26 and the left optical-image display unit 28 are arranged in positions corresponding to the right and left eyes of the user during wearing of the head mounted display HM. One end of the right optical-image display unit 26 and one end of the left optical-image display unit 28 are respectively connected to a position corresponding to the middle of the forehead of the user during wearing of the head mounted display HM. The right holding unit 21 extends from an end ER, which is the other end, of the right optical-image display unit 26. Similarly, the left holding unit 23 extends from an end EL, which is the other end, of the left optical-image display unit 28.

The right holding unit 21 is a member provided to extend from the end ER of the right optical-image display unit 26 to a position corresponding to the temporal region of the user during wearing of the head mounted display HM to form a substantial right angle with the right optical-image display unit 26. Similarly, the left holding unit 23 is a member provided to extend from the end EL of the left optical-image display unit 28 to the temporal region of the user during wearing of the head mounted display HM to form a substantial right angle with the left optical-image display unit 28. The right holding unit 21 and the left holding unit 23 hold the head mounted display HM on the head of the user like temples of eyeglasses.

The right display driving unit 22 is arranged on the inner side of the right holding unit 21, in other words, a side opposed to the head of the user during wearing of the head mounted display HM and the end ER side of the right optical-image display unit 26. The left display driving unit 24 is arranged on the inner side of the left holding unit 23 and the end EL side of the left optical-image display unit 28. In the following explanation, the right holding unit 21 and the left holding unit 23 are collectively simply referred to as "holding unit", the right display driving unit 22 and the left display driving unit 24 are collectively simply referred to as "display driving unit", and the right optical-image display unit 26 and the left optical-image display unit 28 are collectively simply referred to as "optical-image display unit".

The display driving unit includes an LCD (Liquid Crystal Display), a projection optical system, and the like not shown in the figure. Details are explained below. The optical-image display unit functioning as an optical member includes a light guide plate and a dimming plate not shown in the figure. The light guide plate is formed by a light transmissive resin material or the like and emits image light captured from the display driving unit to the eyes of the user. The dimming plate is a thin plate-like optical element and is arranged to cover the front side of the head mounted display HM, in other words, a side opposite to the side of the eyes of the user. The dimming plate protects the light guide plate and suppresses damage to the light guide plate, adhesion of stains, and the like. Further, the dimming plate can adjust an amount of external light made incident on the eyes of the user by adjusting light transmittance and adjust easiness of visual recognition of a virtual image. The dimming plate can be omitted.

The digital video camera 61 is arranged in a position corresponding to the middle of the forehead of the user during wearing of the head mounted display HM. In the following explanation, the digital video camera is simply referred to as "camera". The camera 61 picks up an image of an outside scene in at least a part of a front side direction of the head mounted display HM, in other words, a visual field direction of the user wearing the head mounted display HM and acquires a moving image of a digital format including a motion of the user. The camera 61 is equivalent to the "photographing unit" in the appended claims. The digital camera 61 in this embodiment is illustrated as one digital video camera. However, a stereo video camera including a plurality of digital video cameras may be adopted. The camera 61 may be a camera that intermittently photographs an outside scene in at least a part of the visual field direction of the user wearing the head mounted display HM and acquires a plurality of still images.

The image display unit 20 further includes a connecting unit 40 for connecting the image display unit 20 to the control unit 10. The connecting unit 40 includes a main body cord 48 connected to the control unit 10, two right and left cords 42 and 44 branched from the main body cord 48, and a coupling member 46 provided at a branching point. The right cord 42 is inserted into a housing of the right holding unit 21 from a distal end AP in an extending direction of the right holding unit 21 and connected to the right display driving unit 22. Similarly, the left cord 44 is inserted into a housing of the left holding unit 23 from a distal end AP in an extending direction of the left holding unit 23 and connected to the left display driving unit 24.

The image display unit 20 and the control unit 10 perform transmission of various signals via the connecting unit 40. Connectors (not shown in the figure), which fit with each other, are respectively provided at an end on the opposite side of the coupling member 46 in the main body cord 48 and the control unit 10. The control unit 10 and the image display unit 20 are connected and disconnected according to fitting and unfitting of the connector of the main body cord 48 and the connector of the control unit 10. As the right cord 42, the left cord 44, and the main body cord 48, for example, a metal cable or an optical fiber can be adopted.

The control unit 10 is a device for operating the head mounted display HM. The control unit 10 includes a lighting unit 12, a touch pad 14, a cross key 16, and a power switch 18.

The lighting unit 12 notifies an operation state of the head mounted display HM using a light emission state of the lighting unit 12. The operation state of the head mounted display HM is, for example, ON/OFF of a power supply. As the lighting unit 12, for example, an LED (Light Emitting Diode) is used. The touch pad 14 detects operation by a finger of the user on an operation surface of the touch pad 14 and outputs a signal corresponding to detection content. The cross key 16 detects depressing operation of keys corresponding to up down and left right directions and outputs a signal corresponding to detection content. The power switch 18 detects slide operation of the switch to switch a power supply state to the head mounted display HM.

Figure 2:
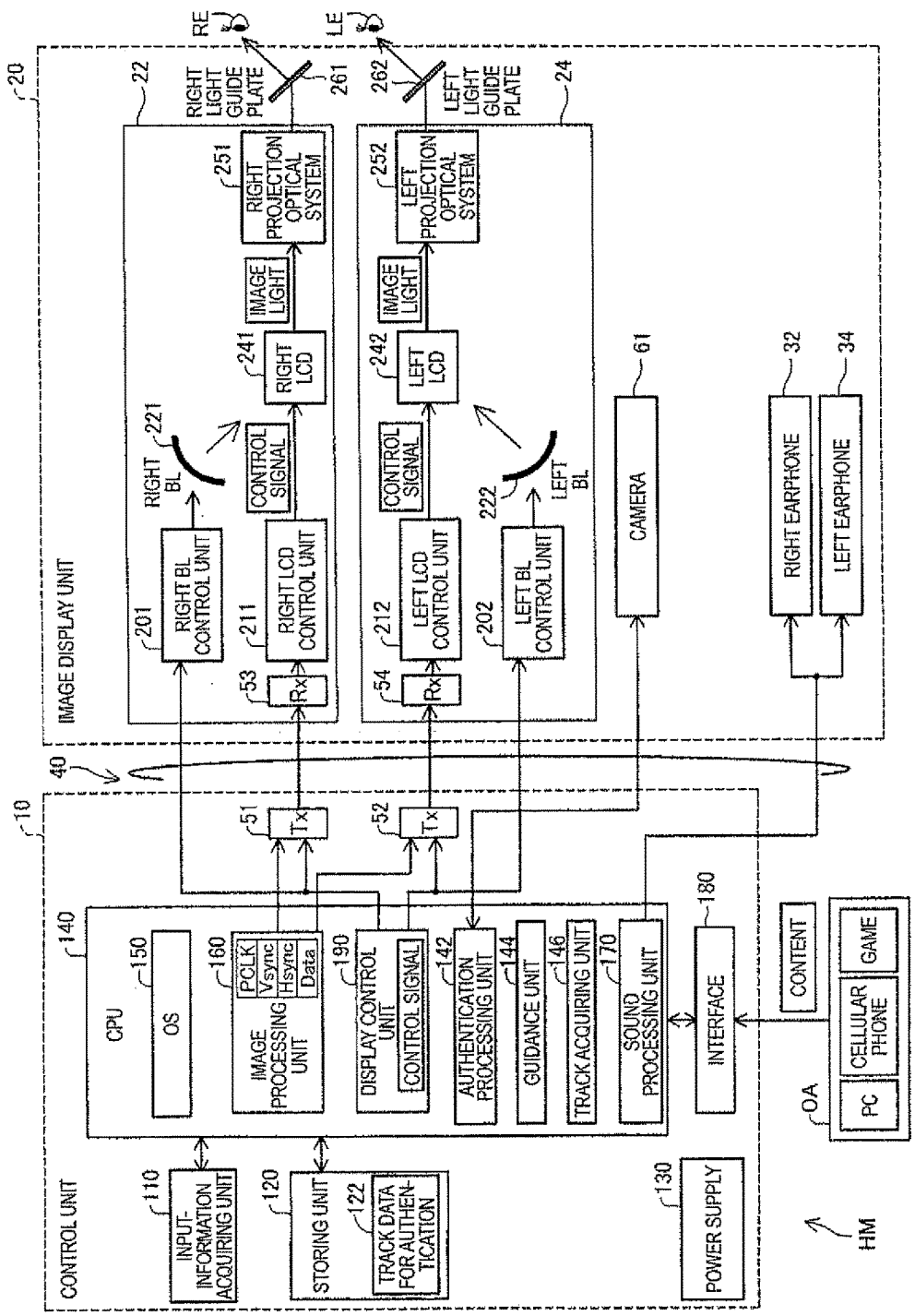
FIG. 2 is a block diagram functionally showing the configuration of a head mounted display HM.

FIG. 2 is a block diagram functionally showing the configuration of the head mounted display HM. The control unit 10 includes an input-information acquiring unit 110, a storing unit 120, a power supply 130, a CPU 140, an interface 180, and transmitting units (Tx) 51 and 52. These units are connected to one another by a bus (not shown in the figure).

The input-information acquiring unit 110 acquires, for example, a signal corresponding to an operation input by the user such as an operation input to the touch pad 14, the cross key 16, the power switch 18, or the like. The storing unit 120 is a storing unit including a ROM, a RAM, a DRAM, and a hard disk. Track data for authentication 122 is included in the storing unit 120. The track data for authentication 122 is information concerning a track of a correct gesture for authentication and is registered in advance by a regular user.

The track data for authentication 122 is used for authenticating whether the user is a proper user in authentication processing. The track data for authentication 122 is equivalent to the "track for authentication" in the appended claims. In the following explanation, authenticating whether the user is the proper user is simply referred to as "authenticate" as well.

Figure 3:
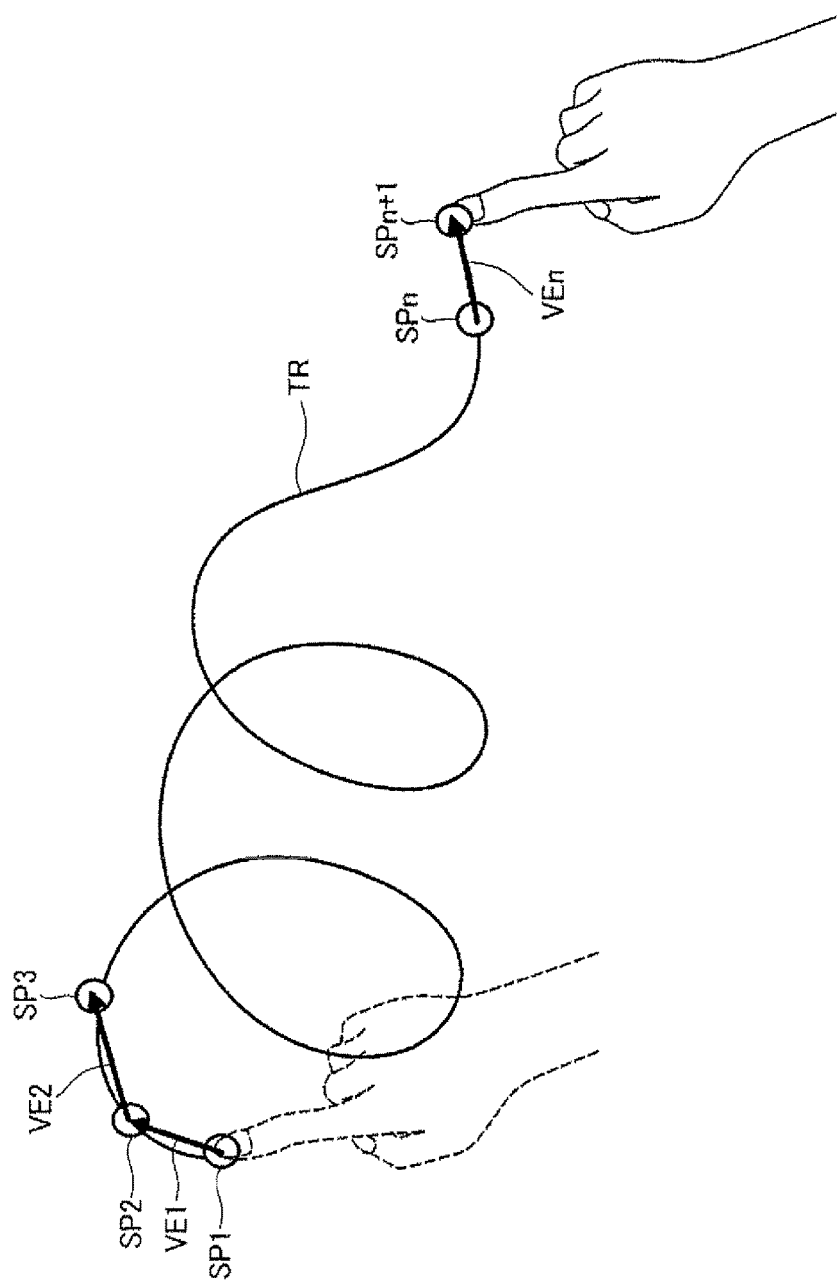
FIG. 3 is an explanatory diagram for explaining a gesture for authentication and track data.

FIG. 3 is an explanatory diagram for explaining a gesture for authentication and track data. The "gesture for authentication" means a "motion of the user". In an example in this embodiment, it is assumed that the motion of the user is specified by a motion of a part of the body of the user. The gesture for authentication is set in advance by the proper user and used as substitute means for a well-known password. In an example shown in FIG. 3, the movement (the motion) itself of the hand is the gesture for authentication. In this embodiment, when an arbitrary place of a part of the body of the user is set as a specific point, the "track" is a change of the specific point. The specific point can be, for example, a finger tip, a joint of the hand, or a wrist. In this embodiment, the "fingertip of the index finger" is set as the specific point. The "track data" is data converted from the track.

The motion of the user may be specified by a motion of an arbitrary object held by the user. The arbitrary object is, for example, an indicator such as a pen, an ornament such as a ring, or a slip such as a driver's license. When the arbitrary object is the indicator such as a pen, an indicator having an infrared ray luminous body attached to a pin tip is preferable from the viewpoint of easiness of track acquisition. In such a case, when an arbitrary place in the object held by the user is set as a specific point, the "track" is represented by a change of the specific point. The specific point can be, for example, a distal end of the pen, a luminous body of the pen, a jewel of the ring, or a photograph portion of the driver's license.

The motion of the user may be specified by a motion of an arbitrary object imaginarily held by the user. The "arbitrary object imaginarily held" means, for example, when the shape of the hand of the user is a pen-gripping shape, a pen imaginarily assumed to extend along the shape of the hand. Even in such a case, as explained above, when an arbitrary place of the imaginary object imaginarily held by the user is set as a specific point, the track can be represented by a change of the specific point.

The "track", which is the change of the specific point, can be specified by changes in a moving direction and a movement amount of the specific point. The moving direction and the movement amount can be calculated, for example, as explained below. First, the position of the specific point is repeatedly acquired at a predetermined time interval.

The direction of a vector (an arrow) imaginarily connecting a position acquired in the n-th acquisition and a position acquired in the n+1th acquisition is the moving direction.

The magnitude of the vector (the arrow) imaginarily connecting the position acquired in the n-th acquisition and the position acquired in the n+1th acquisition is the movement amount.

The position can be defined as, for example, changes in the X direction and the Y direction from (0, 0), which is a coordinate of a pixel in an image at a most upper left portion. Consequently, a track acquiring unit 146 can calculate a moving direction and a movement amount of a part of the body of the user. Therefore, the track acquiring unit 146 can quantitatively specify a track of the gesture (the motion) for authentication according to changes in the moving direction and the movement amount.

In the example shown in FIG. 3, a track TR of the gesture for authentication is specified by a set of kinds of information (1) to (4) below.

(1) The direction and the magnitude of a vector VE1 connecting a position SP1 acquired in the first acquisition and a position SP2 acquired in the second acquisition (2) The direction and the magnitude of a vector VE2 connecting the position SP2 acquired in the second acquisition and a position SP3 acquired in the third acquisition (3) The direction and the magnitude of vectors VE3 to VEn−1 acquired in the third to n−1th acquisitions (4) The direction and the magnitude of a vector VEn connecting a position SPn acquired in the nth acquisition and a position SPn+1 acquired in the n+1th acquisition.

The power supply 130 shown in FIG. 2 supplies electric power to the units of the head mounted display HM. As the power supply 130, for example, a secondary battery can be used.

The CPU 140 executes a computer program installed in advance to provide a function as an operating system (OS) 150. The CPU 140 expands firmware or a computer program, which are stored in the ROM or the hard disk, in the RAM and executes the firmware or the computer program to thereby function as an authentication processing unit 142, a guidance unit 144, the track acquiring unit 146, an image processing unit 160, a sound processing unit 170, and a display control unit 190 as well.

The authentication processing unit 142 executes authentication processing for authenticating whether the user is the proper user. Details of the authentication processing are explained below. The guidance unit 144 performs guidance display for assisting an input of a gesture for authentication by the user in the authentication processing. Details of the guidance display are explained below. In the authentication processing, the track acquiring unit 146 acquires a track of the gesture for authentication from a moving image photographed by the camera 61 and generates track data. A method of acquiring a track is as explained with reference to FIG. 3.

The image processing unit 160 generates, on the basis of content or the like input via the interface 180, a signal to be supplied to the image display unit 20 and transmits the signal to the image display unit 20. The signal to be supplied to the image display unit 20 is different in an analog format and a digital format.

For example, in the case of the analog format, the image processing unit 160 generates and transmits a clock signal PCLK, a vertical synchronization signal VSync, a horizontal synchronization signal HSync, and image data Data. Specifically, the image processing unit 160 acquires an image signal included in the content. For example, in the case of a moving image, in general, the acquired image signal is an analog signal formed by thirty frame images per second. The image processing unit 160 separates synchronization signals such as the vertical synchronization signal VSync and the horizontal synchronization signal HSync from the acquired image signal. The image processing unit 160 generates a clock signal PCLK according to a cycle of the separated vertical synchronization signal VSync, horizontal synchronization signal HSync, and the like using a not-shown PLL circuit or the like. The image processing unit 160 converts an analog image signal, from which the synchronization signals are separated, into a digital image signal using a not-shown A/D conversion circuit or the like. Thereafter, the image processing unit 160 stores the converted digital image signal in the DRAM in the storing unit 120 frame by frame as image data Data of RGB data.

For example, in the case of the digital format, the image processing unit 160 generates and transmits the clock signal PCLK and the image data Data. Specifically, when the content is in the digital format, the clock signal PCLK is output in synchronization with an image signal. Therefore, A/C conversion for the vertical synchronization signal VSync and the horizontal synchronization signal HSync and the analog image signal is unnecessary.

The image processing unit 160 may execute, on the image data Data stored in the storing unit 120, resolution conversion process, various kinds of tone correction processing such as adjustment of luminance and chroma, and image processing such as keystone correction processing.

The image processing unit 160 transmits the clock signal PCLK, the vertical synchronization signal VSync, and the horizontal synchronization signal HSync generated as explained above and the image data Data stored in the DRAM in the storing unit 120 respectively via the transmitting units 51 and 52. The image data Data transmitted via the transmitting unit 51 is referred to as "image data for right eye Data1" as well and the image data Data transmitted via the transmitting unit 52 is referred to as "image data for left eye Data2" as well. The transmitting units 51 and 52 function as a transceiver for serial transmission between the control unit 10 and the image display unit 20.

The display control unit 190 generates a control signal for controlling the right display driving unit 22 and the left display driving unit 24. Specifically, the display control unit 190 individually controls, according to control signals, driving ON/OFF of a right LCD 241 by a right LCD control unit 211, driving ON/OFF of a right backlight 221 by a right backlight control unit 201, driving ON/OFF of a left LCD 242 by a left LCD control unit 212, driving ON/OFF of a left backlight 222 by a left backlight control unit 202, and the like to thereby control generation and emission of image light by each of the right display driving unit 22 and the left display driving unit 24. For example, the display control unit 190 causes both of the right display driving unit 22 and the left display driving unit 24 to generate image lights, causes one of the right display driving unit 22 and the left display driving unit 24 to generate image light, or causes none of the right display driving unit 22 and the left display driving unit 22 to generate image light.

The display control unit 190 transmits control signals to the right LCD control unit 211 and the left LCD control unit 212 respectively via the transmitting units 51 and 52. The display control unit 190 transmits control signals to the right backlight control unit 201 and the left backlight control unit 202 respectively via the transmitting units 51 and 52.

The sound processing unit 170 acquires a sound signal included in the content, amplifies the acquired sound signal, and supplies the sound signal to a not-shown speaker in a right earphone 32 and a not-shown speaker in a left earphone 34 of the image display unit 20 via the connecting unit 40. For example, when a Dolby (registered trademark) system is adopted, processing for the sound signal is performed and different kinds of sound having different frequencies or the like are respectively output from the right earphone 32 and the left earphone 34.

The interface 180 is an interface for connecting various external apparatuses OA, which are supply sources of contents, to the control unit 10. As the external apparatuses OA, there are, for example, a personal computer PC, a cellular phone terminal, and a game terminal. As the interface 180, for example, a USB interface, a micro USB interface, an interface for a memory card, or a wireless LAN interface can be provided.

The image display unit 20 includes the right display driving unit 22, the left display driving unit 24, a right light guide plate 261 functioning as the right optical-image display unit 26, a left light guide plate 262 functioning as the left optical-image display unit 28, the camera 61, the right earphone 32, and the left earphone 34.

The right display driving unit 22 includes a receiving unit (Rx) 53, the right backlight (BL) control unit 201 and the right backlight (BL) 221 functioning as a light source, the right LCD control unit 211 and the right LCD 241 functioning as a display element, and a right projection optical system 251. The right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 has a function of driving the right backlight 221 on the basis of an input control signal. The right backlight 221 is a luminous body such as an LED or electroluminescence (EL). The right LCD control unit 211 has a function of driving the right LCD 241 on the basis of the clock signal PCLK, the vertical synchronization signal VSync, the horizontal synchronization signal HSync, and the image data for right eye Data1 input via the receiving unit 53. The right LCD 241 is a transmissive liquid crystal panel in which a plurality of pixels are arranged in a matrix shape.

Figure 4:
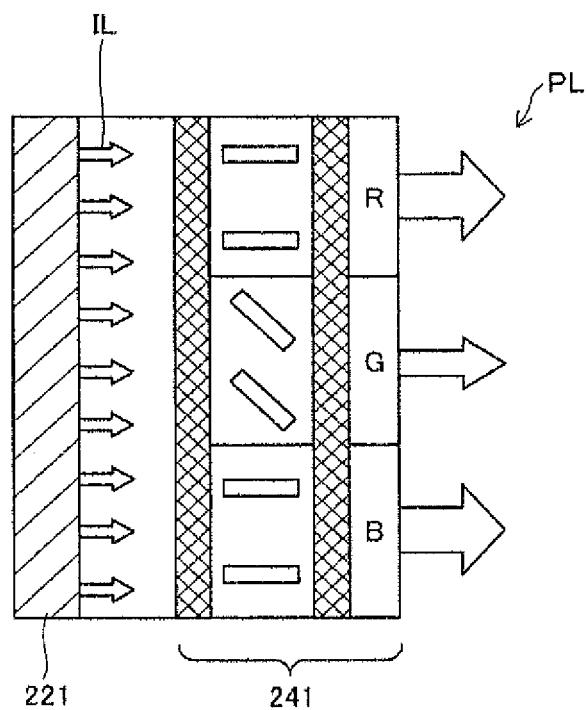
FIG. 4 is an explanatory diagram showing a state in which image light is emitted by an image-light generating unit.

FIG. 4 is an explanatory diagram showing a state in which image light is emitted by the image-light generating unit. The right LCD 241 has a function of driving liquid crystal corresponding to the positions of the pixels arranged in a matrix shape to change the transmittance of light transmitted through the right LCD 241 to thereby modulate illumination light IL irradiated from the right backlight 221 into effective image light PL representing an image. As shown in FIG. 4, in this embodiment, a backlight system is adopted. However, the image-light generating unit may emit image light using a front light system or a reflection system.

The right projection optical system 251 shown in FIG. 3 includes a collimate lens configured to change image light emitted from the right LCD 241 into a light beam in a parallel state. The right light guide plate 261 functioning as the right optical-image display unit 26 guides image light output from the right projection optical system 251 to the right eye RE of the user while reflecting the image light along a predetermined optical path. The right projection optical system 251 and the right light guide plate 261 are collectively referred to as "light guiding unit" as well. The light guiding unit can adopt an arbitrary system as long as a virtual image is formed before the eyes of the user using the image light. For example, a diffraction grating may be used or a semi-transparent reflection film may be used.

The configurations and the operations of the units of the left display driving unit 24 are the same as the configurations and the operations of the units of the right display driving unit 22 explained above. Therefore, detailed explanation of the configurations and the operations is omitted.

Figure 5:
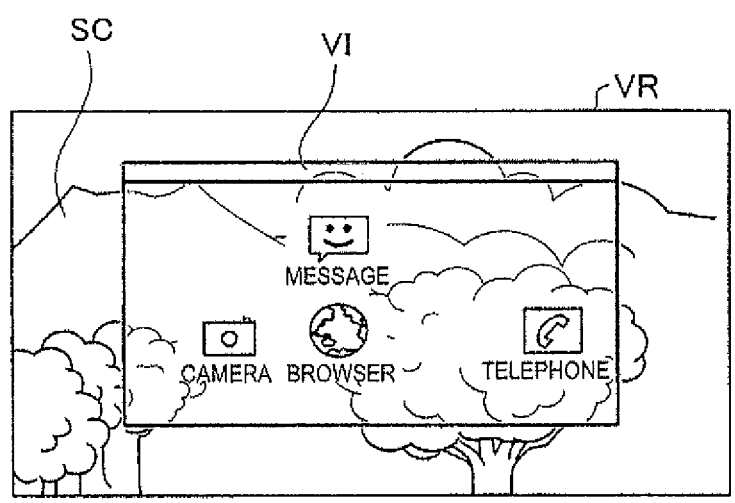
FIG. 5 is an explanatory diagram showing an example of a virtual image recognized by a user.

FIG. 5 is an explanatory diagram showing an example of a virtual image recognized by the user. As explained above, the image lights guided to both the eyes of the user of the head mounted display HM are focused on the retinas of the user. Consequently, the user can visually recognize a virtual image. As shown in FIG. 5, a virtual image VI is displayed in a visual field VR of the user of the head mounted display HM. Concerning a portion of the visual field VR of the user where the virtual image VI is displayed, the user can see an outside scene SC via the virtual image VI on the optical-image display unit. Further, concerning portions other than the portion of the visual field VR of the user where the virtual image VI is displayed, the user can directly see the outside scene SC through the optical-image display unit. A region where the virtual image VI is displayed is referred to as "display region of a virtual image" as well.

A-2. Authentication Processing

Figure 6:
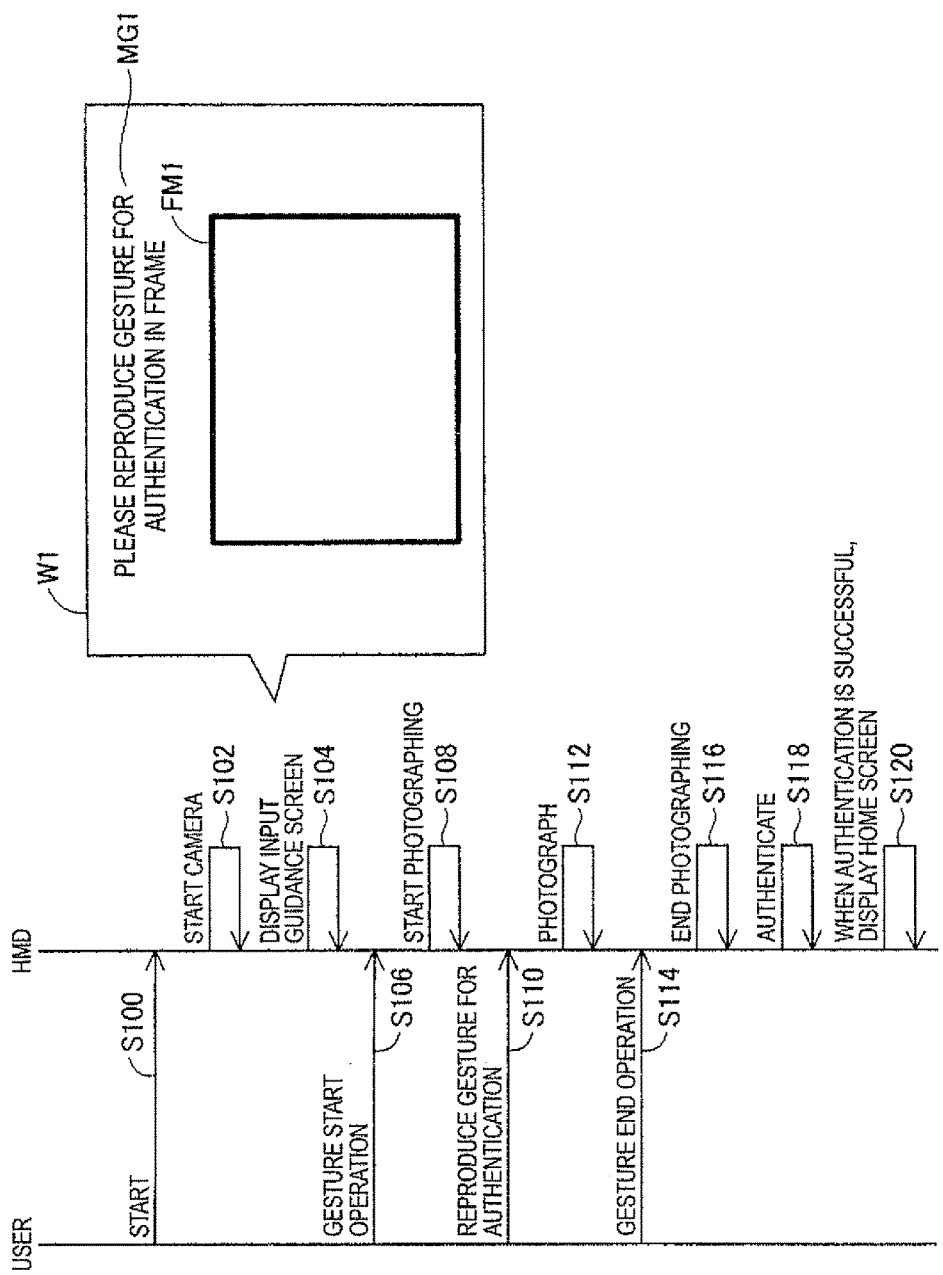
FIG. 6 is a sequence chart showing a procedure of authentication processing.

FIG. 6 is a sequence chart showing a procedure of the authentication processing. The authentication processing is processing for authenticating whether the user is the proper user. The authentication processing in this embodiment is started by being triggered by the start of the head mounted display HM, in other words, detection of power-on (step S100). The authentication processing unit 142 starts the camera 61 (step S102).

The authentication processing unit 142 causes the guidance unit 144 to display an input guidance display screen (step S104). An input guidance display screen W1 is a screen for assisting an input of a gesture for authentication by the user. In an example shown in FIG. 6, the input guidance display screen W1 includes a guidance message MG1 and a guidance frame FM1. The guidance message MG1 is a character string indicating that the user is requested to reproduce a gesture for authentication. The guidance frame FM1 is an image of a frame indicating an overlapping region where a display region for a virtual image and a photographing region of the camera 61 overlap. The guidance unit 144 can learn the photographing region of the camera 61 using various methods. For example, in initial setting of the head mounted display HM, the photographing region of the camera 61 may be calibrated and stored in the storing unit 120. A "region where the camera 61 can surely perform photographing" smaller than an actual photographing region of the camera 61 may be stored in the storing unit 120 in advance.

The guidance unit 144 generates image data of the input guidance display screen W1 explained above and transmits the image data to the image processing unit 160. In the image processing unit 160 that receives the image data of the input guidance display screen W1, the processing explained with reference to FIG. 3 is executed. As a result, the input guidance display screen W1 shown in FIG. 6 is displayed in the visual field VR of the user of the head mounted display HM as the virtual image VI.

The user performs, according to the input guidance display screen W1, gesture starting operation set in advance (step S106). In this embodiment, detection of stillness of the specific point (the fingertip of the index finger) for a predetermined time or more by the camera 61, in other words, detection of stillness of the motion of the user for the predetermined time or more is set as the gesture starting operation. Therefore, the user lifts the hand to the front of the eyes such that the fingertip of the index finger is photographed in the guidance frame FM1 of the input guidance display screen W1 and stops the fingertip. The camera 61 detects the gesture starting operation by the user and starts photographing of a gesture video (step S108). In step S108, the guidance unit 144 may display, on the input guidance display screen W1, to the effect that the photographing of a gesture image is started.

The user reproduces a gesture for authentication in the guidance frame FM1 of the input guidance display screen W1 (step S110). At this point, the user reproduces a gesture same as a gesture for authentication determined in advance and registered in the track data for authentication 122 by the user. The camera 61 continues the photographing of the gesture video (step S112).

The user performs gesture ending operation set in advance in the guidance frame FM1 of the input guidance display screen W1 (step S114). In this embodiment, detection of stillness of the specific point (the fingertip of the index finger) for a predetermined time or more by the camera 61 is set as the gesture ending operation. Therefore, after reproducing the gesture for authentication, the user stops the fingertip of the index finger in the guidance frame FM1 of the input guidance display screen W1. The camera 61 detects the gesture ending operation by the user and ends the photographing of the gesture video (step S116). In step S116, the guidance unit 144 may cause the input guidance display screen W1 to display to the effect that the photographing of the gesture video is ended.

The authentication processing unit 142 acquires a moving image of the gesture video photographed by the camera 61 and performs authentication of the user (step S118). Specifically, the authentication processing unit 142 causes the track acquiring unit 146 to generate track data on the basis of the moving image of the gesture video acquired in step S118. The authentication processing unit 142 compares (i) a track of the gesture for authentication included in the track data generated by the track acquiring unit 146, i.e., a track of the gesture for authentication photographed in step S112 and (ii) a track of the gesture for authentication included in the track data for authentication 122 and calculates similarity between the tracks. The similarity can be calculated using various methods such as cosine similarity, a Pearson correlation coefficient, and deviation pattern similarity.

When the similarity between the track (i) and the track (ii) is equal to or higher than a first threshold, the authentication processing unit 142 determines that the authentication of the user is successful. Determining that the authentication of the user is successful is, in other words, determining that the user currently operating the head mounted display HM is the proper user. On the other hand, when the similarity between the track (i) and the track (ii) is lower than the first threshold, the authentication processing unit 142 determines that the authentication of the user is unsuccessful. The first threshold in step S118 can be arbitrarily set according to a security level required in the head mounted display HM. If the first threshold is set high, the authentication of the user in the head mounted display HM can be made stricter. On the other hand, if the first threshold is set low, the authentication of the user in the head mounted display HM can be made looser.

When the authentication in step S118 is successful, the authentication processing unit 142 causes the image processing unit 160 and the display control unit 190 to display a home screen of the operating system (step S120). Consequently, the user can use various functions of the head mounted display HM. In step S118, the authentication processing unit 142 may end the start of the camera 61 before performing the authentication of the user.

In step S118, the authentication processing unit 142 may compare the track (i) and a track obtained by converting a track used for authentication as the track (i) in the past using at least one method among non-magnification, lateral direction enlargement, longitudinal direction enlargement, lateral direction reduction, and longitudinal direction reduction and, when similarity between the tracks is equal to or higher than a second threshold, determine that the authentication of the user is unsuccessful. The second threshold can be arbitrarily set as long as the second threshold is higher than the first threshold. However, since the second threshold is a threshold for determining whether the track (i) is duplication of the "track used for authentication in the past", the second threshold is preferably set high. Consequently, it is possible to suppress an act of duplicating a track acquired by the track acquiring unit 146 and used for authentication in the past and impersonating the proper user.

As explained above, with the head mounted display HM (the head-mounted display device) in the first embodiment, the authentication processing unit 142 authenticates whether the user is the proper user using the track of the motion of the user (in other words, the track of the gesture for authentication). Therefore, compared with authentication performed using a character string or an image, it is difficult to duplicate information used as a key for the authentication. As a result, in the head mounted display HM, it is possible to reduce a risk of impersonation and realize authentication with further improved security.

Further, in step S104, the guidance unit 144 informs, using the guidance frame FM1, the user of the overlapping region where the display region of the virtual image VI and the photographing region of the camera 61 (the photographing unit) overlap. Therefore, the user can learn where the user should reproduce the gesture for authentication. As a result, it is possible to improve convenience for the user.

Further, in steps S108 to S116, after detecting the gesture starting operation (the start trigger) set in advance, the camera 61 (the photographing unit) photographs a moving image until the camera 61 detects the gesture ending operation (the end trigger) set in advance. Therefore, the camera 61 can photograph only the track of the gesture for authentication used as the key for the authentication.

Further, in step S118, when the similarity between the track acquired by the track acquiring unit 146 ((i) the track of the gesture for authentication included in the track data generated by the track acquiring unit 146, i.e., the track of the gesture for authentication photographed in step S112) and the track for authentication ((ii) the track of the gesture for authentication included in the track data for authentication 122) is equal to or higher than the first threshold, the authentication processing unit 142 determines that the user is the proper user. Therefore, it is possible to realize authentication that allows a fluctuation of the motion of the body of the user.

A-3. Variations of the Authentication Processing

In the following explanation, various variations in the authentication processing shown in FIG. 6 are explained.

A-3-1. Variation 1

Figure 7A:
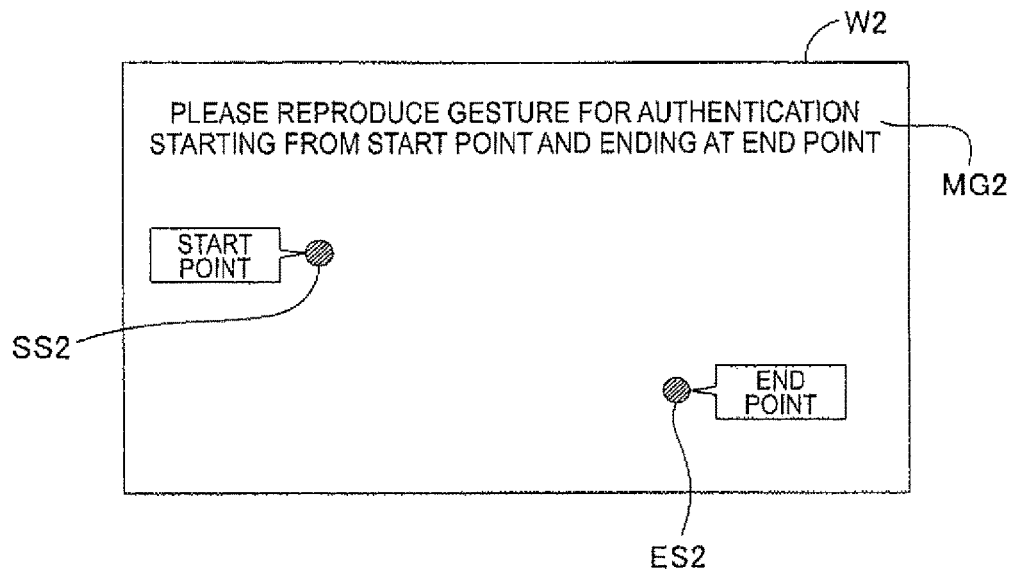
FIGS. 7A and 7B are explanatory diagrams showing other examples of an input guidance display screen displayed in step S104 of the authentication processing (FIG. 6).
Figure 8A:
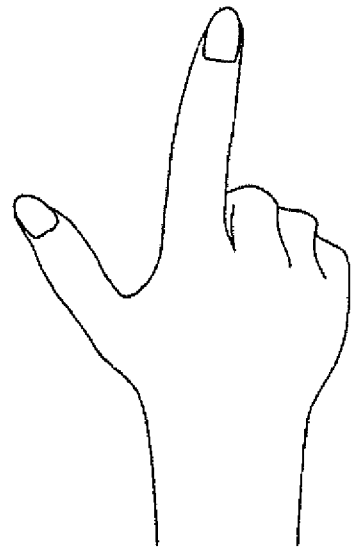
FIGS. 8A and 8B are explanatory diagrams showing other examples of gesture starting operation and gesture ending operation used in the authentication processing (FIG. 6).
Figure 8B:
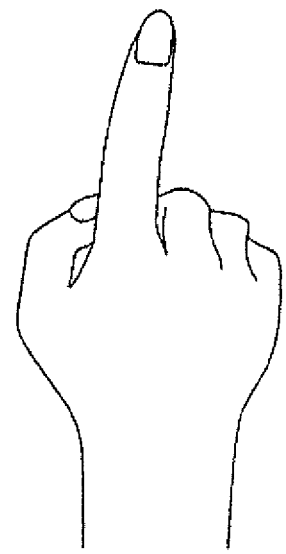

FIGS. 7A and 8B are explanatory diagrams showing another example of the input guidance display screen displayed in step S104 of the authentication processing (FIG. 6). FIG. 7A shows first another example of the input guidance display screen. Like the input guidance display screen W1, an input guidance display screen W2 is a screen for assisting an input of a gesture for authentication by the user. In the example shown in FIG. 7A, the input guidance display screen W2 includes a guidance message MG2, a start point symbol SS2, and an end point symbol ES2. The guidance message MG2 is a character string for requesting the user to reproduce a gesture for authentication to start the gesture for authentication at a start point and end the gesture for authentication at an end point. The start point symbol SS2 is a figure obtained by adding a character string indication indicating the start point to a circular figure. The end point symbol ES2 is a figure obtained by adding a character string indication indicating an end point to a circular figure.

In step S104 of the authentication processing (FIG. 6), the input guidance display screen W2 shown in FIG. 7A may be used instead of the input guidance display screen W1 shown in FIG. 6. In this case, the "gesture starting operation set in advance" explained in steps S106 and S108 is performed when the camera 61 detects that the specific point (the fingertip of the index finger) passes the start point symbol SS2. Therefore, in step S106, the user lifts the hand to the front of the eyes such that the fingertip of the index finger overlaps the start point symbol SS2 of the input guidance display screen W2. Similarly, the "gesture ending operation set in advance" in steps S114 and S116 is performed when the camera 61 detects that the specific point (the fingertip of the index finger) passes the end point symbol ES2. Therefore, in step S114, the user reproduces the gesture for authentication such that the fingertip of the index finger overlaps the end point symbol ES2 of the input guidance display screen W2.

In this way, it is possible to obtain effects same as the effects of the authentication processing performed using the input guidance display screen W1. When the input guidance display screen W2 is used, the guidance unit 144 can visually clearly inform the user of a start point where the reproduction of the gesture for authentication is started and an end point where the reproduction of the gesture for authentication is ended. Therefore, it is possible to improve usability for the user.

A-3-2. Variation 2

Figure 7B:
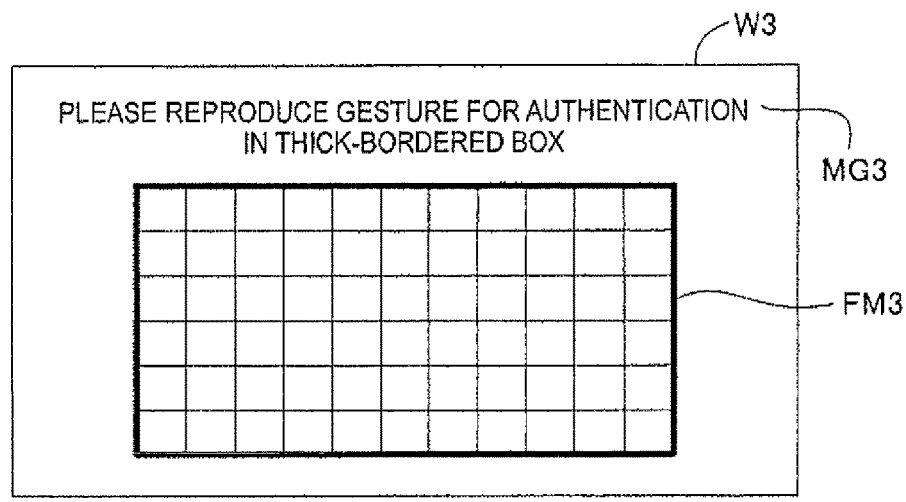

FIG. 7B shows second another example of the input guidance display screen. Like the input guidance display screen W1, an input guidance display screen W3 is a screen for assisting an input of a gesture for authentication by the user. In the example shown in FIG. 7B, the input guidance display screen W3 includes a guidance message MG3 and a guidance frame FM3. The guidance message MG3 is a character string for requesting the user to reproduce a gesture for authentication.

The guidance frame FM3 is an image of a frame indicating an overlapping region where a display region of a virtual image and a photographing region of the camera 61 overlap. The guidance frame FM3 is different from the guidance frame FM1 only in that the inside of the frame is divided into squares.

In step S104 of the authentication processing (FIG. 6), the input guidance display screen W3 shown in FIG. 7B may be used instead of the input guidance display screen W1 shown in FIG. 6. In this case, steps S106 and S114 are the same as the steps of the procedure explained with reference to FIG. 6.

In this way, it is possible to obtain effects same as the effects of the authentication processing performed using the input guidance display screen W1. When the input guidance display screen W3 is used, the guidance unit 144 presents the guidance frame FM3 divided into squares to the user. The guidance frame FM3 assists the user in grasping a distance in a space and facilitates the reproduction of the gesture for authentication. That is, it is possible to improve usability for the user.

A-3-3. Variation 3

FIGS. 8A and 8B are explanatory diagrams showing other examples of the gesture starting operation and the gesture ending operation used in the authentication processing (FIG. 6). FIG. 8A is a first shape of the hand of the user. FIG. 8B is a second shape of the hand of the user.

In the authentication processing (FIG. 6), instead of the gesture starting operation and the gesture ending operation explained above, detection of predetermined shapes of a part of the body of the user shown in FIGS. 8A and 8B may be performed as the gesture starting operation and the gesture ending operation. Specifically, in steps S106 and S108 of the authentication processing (FIG. 6), when the camera 61 detects that the hand of the user has the first shape, it may be assumed that the gesture starting operation is performed. In steps S114 and S116 of the authentication processing (FIG. 6), when the camera 61 detects that the hand of the user has the second shape, it may be assumed that the gesture ending operation is performed.

In this way, it is possible to obtain effects same as the effects obtained when the gesture starting operation and the gesture ending operation explained with reference to FIG. 6 are used. When the gesture starting operation and the gesture ending operation explained with reference to FIGS. 8A and 8B are used, the user can clearly express the start of the reproduction of the gesture for authentication and the end of the reproduction of the gesture for authentication. Therefore, it is possible to improve usability for the user.

B. Second Embodiment

In a second embodiment of the invention, a configuration in which authentication processing is performed by a server provided separately from a head-mounted display device will be explained. In the following explanation, only sections, the configurations and the operations of which are different from the configurations and the operations in the first embodiment, are explained. In the figures, components same as the components in the first embodiment are denoted by reference numerals and signs same as the reference numerals and signs in the first embodiment explained above. Detailed explanation of the components is omitted.

B-1. Configuration of an Authentication System

Figure 9:
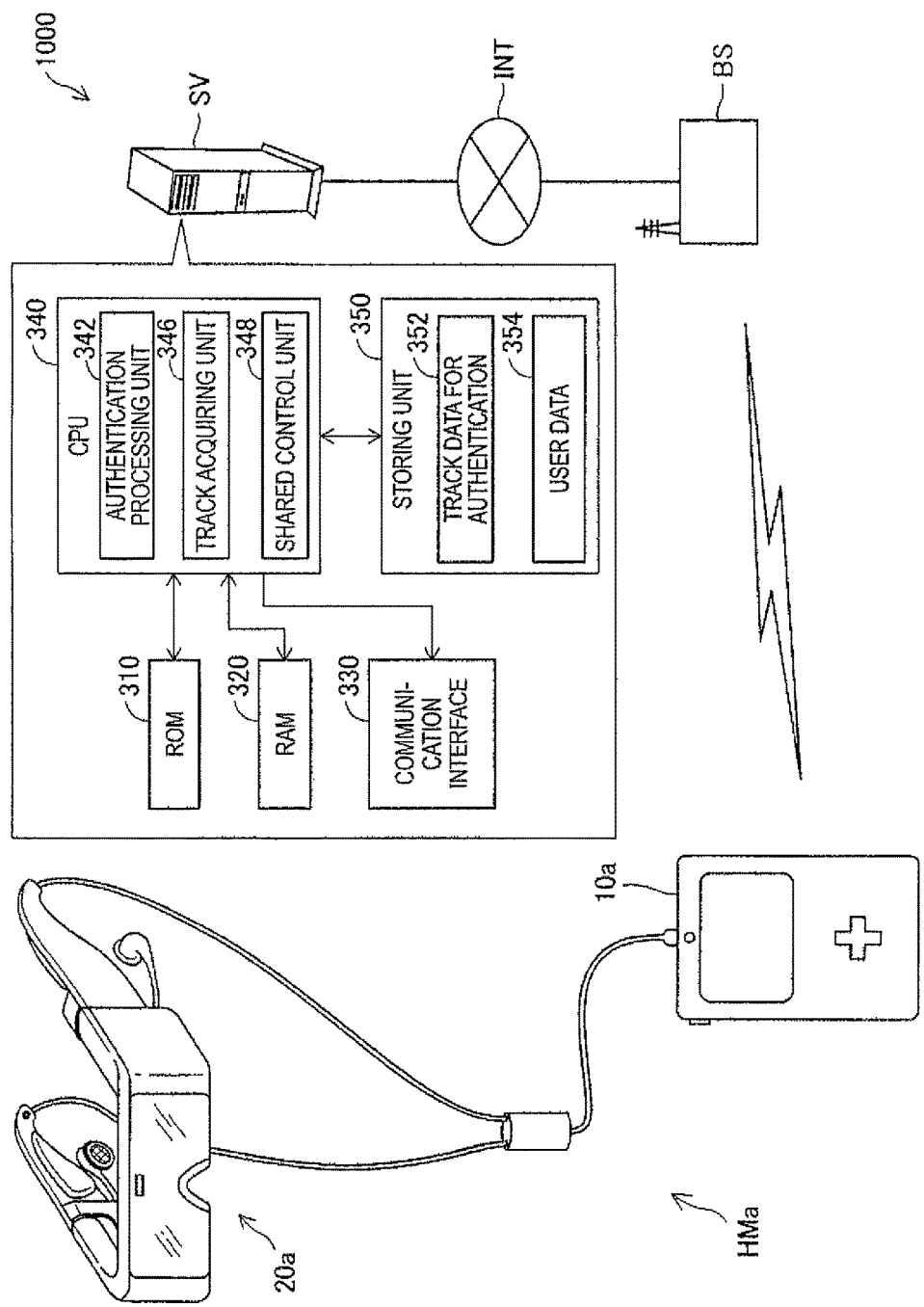
FIG. 9 is an explanatory diagram showing a configuration example of an authentication system in a second embodiment.

FIG. 9 is an explanatory diagram showing a schematic configuration of an authentication system in a second embodiment. An authentication system 1000 in the second embodiment includes a head mounted display HMa and a server SV. The head mounted display HMa is connected to the Internet INT by radio communication via a communication carrier BS. The server SV is connected to the Internet INT by wire communication. As a result, the server SV and the head mounted display HMa are connected to each other by the Internet INT. The communication carrier BS includes a transmission and reception antenna, a radio base station, and a switching station. The server SV is equivalent to the "authentication server" in the appended claims.

The configuration of the head mounted display HMa in the second embodiment is substantially the same as the configuration in the first embodiment explained with reference to FIGS. 1 and 2. However, the head mounted display HMa in the second embodiment is different from the head mounted display HM in the first embodiment in that the head mounted display HMa does not include the track data for authentication 122 and the track acquiring unit 146, includes an authentication control unit 148 instead of the authentication processing unit 142, and includes a wireless LAN interface as the interface 180. The authentication control unit 148 controls authentication processing in the second embodiment. Details of the authentication processing are explained below. The interface 180 of the head mounted display HMa is equivalent to the "transmitting unit" in the appended claims.

The server SV in the second embodiment includes a ROM 310, a RAM 320, a communication interface 330, a CPU 340, and a storing unit 350. These units are connected to one another by a bus. The communication interface 330 performs communication with other devices such as the head mounted display HMa via the Internet INT. The CPU 340 expands a computer program, which is stored in the ROM 310 or the storing unit 350, in the RAM 320 and executes the computer program to thereby function as an authentication processing unit 342, a track acquiring unit 346, and a sharing control unit 348 as well.

The authentication processing unit 342 cooperates with the authentication control unit 148 of the head mounted display HMa and executes authentication processing for authenticating whether a user is a proper user. Details of the authentication processing are explained below. In the authentication processing, the track acquiring unit 346 acquires a track of a gesture for authentication from a moving image received from the head mounted display HMa and generates track data. A method of acquiring a track is as explained with reference to FIG. 3. The sharing control unit 348 provides a user of an apparatus connected to the server SV with a so-called online storage function. Details of the online storage function are explained below. The communication interface 330 of the server SV is equivalent to the "transmitting unit" in the appended claims. The sharing control unit 348 is equivalent to the "function providing unit" in the appended claims.

The storing unit 350 includes, for example, a hard disk. Track data for authentication 352 and user data 354 are included in the storing unit 350. The track data for authentication 352 is information concerning a track of a correct gesture for authentication. Details of the track data for authentication 352 are the same as the details of the track data for authentication 122. The user data 354 is data stored by the online storage function. Various contents including still image content such as a photograph and moving image content such as a movie are included in the user data 354.

B-2. Authentication Processing

Figure 10:
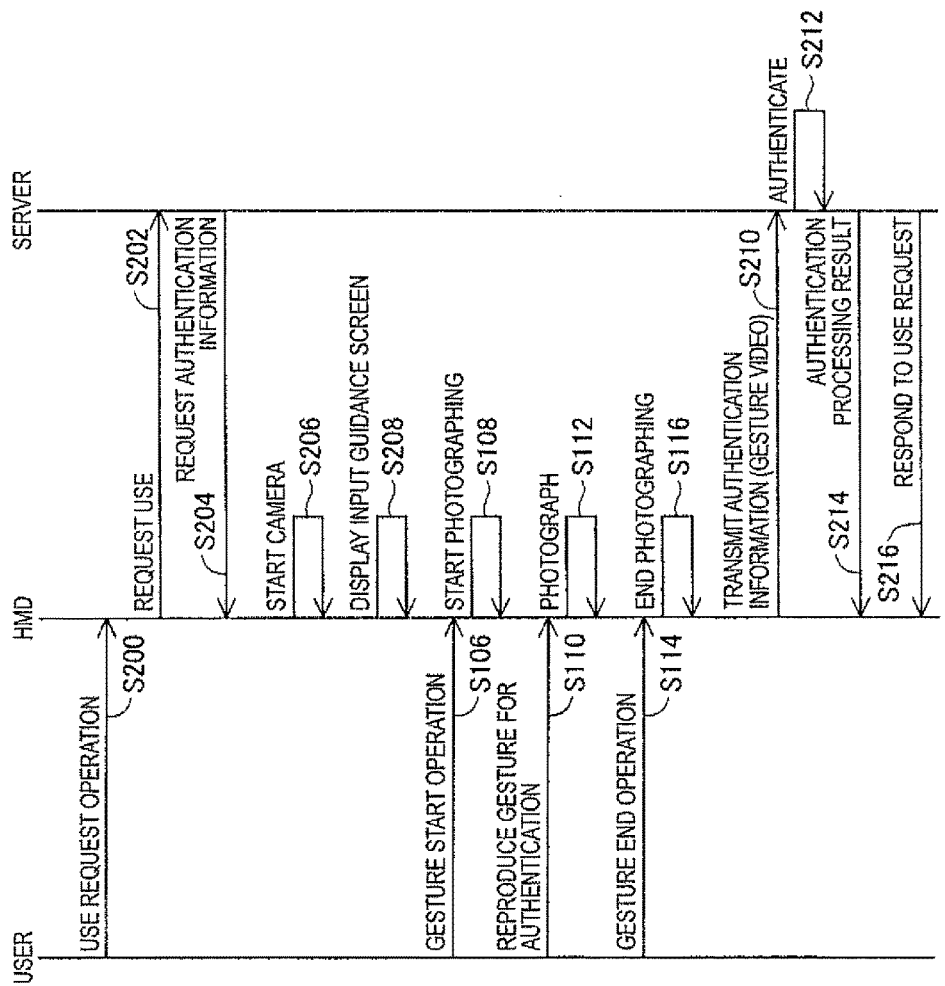
FIG. 10 is a sequence chart showing a procedure of authentication processing in the second embodiment.

FIG. 10 is a sequence chart showing a procedure of the authentication processing in the second embodiment. The authentication processing in this embodiment is started by being triggered by transmission of a request for use of the online storage function from the head mounted display HMa to the server SV.

A user of the head mounted display HMa performs operation for requesting the control unit 10 to use the online storage function (step S200). As the request for use of the online storage function, there are, for example, requests explained below.

A "reading request" for reading a file and a folder in the storing unit 350 of the server SV A "writing request" for writing a file and a folder in the storing unit 350 of the server SV A "change request" for changing a file and a folder in the storing unit 350 of the server SV The OS 150 detects the use request operation and transmits a use request corresponding to the detected operation to the server SV via the interface 180 (step S202).

The authentication processing unit 342 of the server SV receives the use request and requests, via the communication interface 330, the head mounted display HMa to transmit authentication information (step S204). In this embodiment, a moving image of a gesture video is used as the authentication information.

The authentication control unit 148 of the head mounted display HMa receives the request for authentication information and starts the camera 61 (step S206). The authentication control unit 148 causes the guidance unit 144 to display an input guidance display screen (step S208). Details of step S208 are the same as the details of step S104 shown in FIG. 6 except that a control entity is the authentication control unit 148.

The user performs, according to the input guidance display screen W1 (FIG. 6), gesture starting operation set in advance (step S106). The camera 61 detects the gesture starting operation by the user and starts photographing of a gesture video (step S108). The user reproduces a gesture for authentication in the guidance frame FM1 of the input guidance display screen W1 (step S110). At this point, the camera 61 continues the photographing of the gesture video (step S112). The user performs gesture ending operation set in advance in the guidance frame FM1 of the input guidance display screen W1 (step S114). The camera 61 detects the gesture ending operation by the user and ends the photographing of the gesture video (step S116).

The authentication control unit 148 acquires a moving image of the gesture video photographed by the camera 61. The authentication control unit 148 transmits the moving image to the server SV as authentication information through the interface 180 (step S210).

The authentication processing unit 342 of the server SV receives the moving image of the gesture video and performs authentication of the user of the head mounted display HMa using the received moving image (step S212). Details of step S212 are the same as the details of step S118 shown in FIG. 6. However, in step S212, the authentication processing unit 142 shall be read as the authentication processing unit 342 and the track acquiring unit 146 shall be read as the track acquiring unit 346. After the authentication processing ends, the authentication processing unit 342 transmits a result of the authentication processing to the head mounted display HMa via the communication interface 330 (step S214).

When the authentication is successful, the sharing control unit 348 transmits a response to the use request received in step S202 to the head mounted display HMa via the communication interface 330 (step S216). For example, when the use request received in step S202 is a read request for a specific file, the sharing control unit 348 transmits the specific file to be read to the head mounted display HMa. When the use request received in step S202 is a write request for a specific file, the sharing control unit 348 transmits information for causing the head mounted display HMa to display an upload guidance screen for a file to the head mounted display HMa. When the use request received in step S202 is a change request for a specific file, the sharing control unit 348 transmits the specific file to be changed to the head mounted display HMa.

As explained above, with the authentication system 1000 in the second embodiment, the sharing control unit 348 (the function providing unit) limits provision of the online storage function (a predetermined function) to the user until the authentication processing unit 342 determines that the user of the head mounted display HMa (the head-mounted display device) is the proper user. Therefore, it is possible to suppress the online storage function (the predetermined function) provided by the authentication server from being used by an unauthorized user.

B-3. Variation of the Authentication Processing

In the authentication processing (FIG. 10) in the second embodiment, variations same as the variations explained in "A-3. Variation of the authentication processing" can be adopted. Detailed explanation of the variations is omitted.

C. Modifications

In the embodiments explained above, a part of the components realized by hardware may be replaced with software. Conversely, a part of the components realized by software may be replaced with hardware. Besides, modifications explained below are also possible.

Modification 1

In the embodiments, the configuration of the head mounted display is illustrated. However, the configuration of the head mounted display can be arbitrarily set without departing from the spirit of the invention. For example, addition, deletion, conversion, and the like of the components can be performed.

In the embodiments, for convenience of explanation, the control unit includes the transmitting unit and the image display unit includes the receiving unit. However, both of the transmitting unit and the receiving unit in the embodiments have a function of enabling two-way communication and can function as a transmitting and receiving unit.

For example, the connecting unit may be omitted and the control unit and the image display unit may be capable of communicating with each other by radio. Specifically, the control unit further includes a first radio communication unit and the image display unit further includes a second radio communication unit and a power supply. In this case, the first radio communication unit functions as the transmitting unit in the embodiments and the second radio communication unit functions as the receiving unit in the embodiments.

For example, the configurations of the control unit and the image display unit shown in FIG. 2 can be arbitrarily changed. Specifically, for example, the touch pad may be removed from the control unit. The control unit may be operated by only the cross key. The control unit may include another operation interfaces such as an operation stick. Devices such as a keyboard and a mouse may be connectable to the control unit. The control unit may receive inputs from the keyboard and the mouse. A communication unit employing Wi-Fi (wireless fidelity) may be provided in the control unit.

For example, the control unit shown in FIG. 2 is connected to the image display unit via a wire signal transmission line. However, the control unit and the image display unit may be connected via a wireless signal transmission line of a wireless LAN, infrared communication, Bluetooth (registered trademark), or the like.

For example, in the embodiments, the head mounted display is the transmissive head mounted display of a binocular type. However, the head mounted display may be a head mounted display of a monocular type. For example, the head mounted display may be a head mounted display having a form in which the optical-image display unit covers only a part of the eyes of the user, in other words, a form in which the optical-image display unit does not completely cover the eyes of the user. The head mounted display may be configured as a non-transmissive head mounted display in which transmission of an outside scene is blocked in a state in which the user wears the head mounted display.

For example, the functional units such as the image processing unit, the display control unit, the authentication processing unit, the guidance unit, the track acquiring unit, the authentication control unit, and the sound processing unit are explained as being realized by the CPU expanding the computer program, which is stored in the ROM or the hard disk, in the RAM and executing the computer program. However, the functional units may be configured using an ASIC (Application Specific Integrated Circuit) designed to realize the functions of the units.

For example, in the embodiments, the image display unit is the head mounted display worn like the eyeglasses. However, the image display unit may be a normal flat display device (a liquid crystal display device, a plasma display device, an organic EL display device, etc.). In this case, the control unit and the image display unit may be connected via a wire signal transmission line or may be connected via a wireless signal transmission line. Consequently, it is possible to use the control unit as a remote controller for the normal flat display device.

As the image display unit, an image display unit having another shape such as an image display unit worn like a cap may be adopted instead of the image display unit worn like the eyeglasses. As the earphones, an ear hook type or a headband type may be adopted. Alternatively, the earphones may be omitted. For example, the head mounted display may be configured as a head mounted display mounted on a vehicle such as an automobile or an airplane. For example, the head mounted display may be configured as a head mounted display built in a body protector such as a helmet.

For example, in the embodiments, a secondary battery is used as the power supply. However, the power supply is not limited to the secondary battery. Various batteries can be used as the power supply. For example, a primary battery, a fuel battery, a solar battery, and a thermal battery may be used.

For example, in the embodiment, the image-light generating unit is configured using the backlight, the backlight control unit, the LCD, and the LCD control unit. However, the form explained above is only an example. The image-light generating unit may include components for realizing another system in addition to these components or instead of these components.

For example, the image-light generating unit may include an organic EL (Organic Electro-Luminescence) display and an organic-EL control unit. Also, for example, the image-light generating unit may include a digital micromirror device and the like instead of the LCD. For example, it is also possible to apply the invention to a head-mounted display device of a laser retina projection type.

For example, the head mounted display may include a distance measuring sensor instead of the camera and may acquire a track of a gesture for authentication using the distance measuring sensor.

Modification 2

In the embodiments, the example of the authentication processing is explained. However, the procedure of the processing shown in FIGS. 6 and 10 is only an example. Various modifications of the authentication processing are possible. For example, a part of the steps may be omitted or other steps may be added. The order of the steps to be executed may be changed.

For example, in step S104, the message or the like displayed by the guidance unit may be output by sound from the sound processing unit. In this case, the display of the message by the guidance unit may be omitted.

For example, in step S104, when the specific point sticks out from the guidance frame of the input guidance display screen, the guidance unit may inform to that effect using characters or sound.

For example, in steps S106 to S116, the camera photographs a moving image between the start trigger and the end trigger. However, the camera may be configured to continuously photograph a moving image after the start of the camera. In this case, the track acquiring unit detects the start trigger and the end trigger out of the moving image. The track acquiring unit only has to treat a motion of the user between the start trigger and the end trigger as a "gesture for authentication". In such a configuration, it is possible to obtain effects same as the effects in the embodiments.

For example, in step S118, when the similarity between (i) the track of the gesture for authentication photographed in step S112 and (ii) the track of the gesture for authentication included in the track data for authentication 122 is equal to or higher than the first threshold, the authentication processing unit determines that the authentication is successful. However, in addition to the above, the authentication processing unit may further determine additional conditions for determining that the authentication is successful. For example, the additional conditions can be set as explained below.

The authentication processing unit determines whether a password input from a microphone or the like by sound matches a word registered in advance.

The authentication processing unit causes the user to reproduce the gesture for authentication in a state in which an item for security designated in advance is worn or held by the user. The authentication processing unit compares an image of an item for security included in the moving image of the gesture video and an image of the item for security designated in advance and determines whether the images match. As the item for security, for example, a ring, a watch, a bracelet, a fake fingernail, or the like can be designated. Consequently, it is possible to perform authentication of the user by combining a plurality of kinds of authentication methods. Therefore, it is possible to make security in the head mounted display firmer.

Modification 3

In the authentication processing (FIGS. 6 and 10) in the embodiments, the several combination examples of the gesture starting operation used as the start trigger for starting photographing of a moving image and the gesture ending operation used as the end trigger for ending the photographing of the moving image are explained. However, the combinations are only examples. Various combinations are possible.

For example, the gesture starting operation can be performed when the camera detects that the specific point (the fingertip of the index finger) stands still for a predetermined time or more. The gesture ending operation can be performed when the camera detects that the specific point (the fingertip of the index finger) passes the end point symbol. For example, the gesture starting operation can be performed when the camera detects that the hand of the user has the first shape. The gesture ending operation can be performed when the camera detects that the specific point (the fingertip of the index finger) stands still for the predetermined time or more.

Modification 4

In the authentication processing (FIGS. 8A and 8B) in the embodiments, as other examples of the gesture starting operation and the gesture ending operation, the examples of the shapes of the hand of the user are explained. However, the shapes shown in FIGS. 8A and 8B are only examples. The shapes can be variously changed.

For example, the shapes of the hand of the user can be various shapes such as a shape with the fingers folded up and only the thumb raised, a shape with the index finger and the middle finger raised and the other fingers folded up (a peace sign), and a shape with the thumb, the index finger, and the little finger raised and the other fingers folded up.

For example, the first shape of the hand of the user and the second shape of the hand of the user may be designated in advance by the user and stored in the storing unit.

Consequently, the user can set shapes memorable for the user as shapes of the hand for distinguishing the gesture starting operation and the gesture ending operation.

Modification 5

In the second embodiment, the configuration of the authentication system is illustrated. However, the configuration of the authentication system can be arbitrarily set without departing from the spirit of the invention. For example, addition, deletion, conversion, and the like of the apparatuses such as the head mounted display and the server can be performed. Further, addition, deletion, conversion, and the like of the components in the head mounted display, the server, and the like can be performed.

For example, in the second embodiment, the server includes the sharing control unit configured to provide the online storage function. In order to permit the use of the online storage function, in the authentication processing, the server checks propriety of the user of the head mounted display. However, the server can be configured to be capable of providing various other functions instead of the online storage function. As the various other functions, there are, for example, a content download function and a virus detection server function.

For example, when the server is configured to realize the virus detection server function instead of the online storage function, after checking propriety of the user of the head mounted display in the authentication processing, the server can execute a virus scan for the head mounted display. For example, the server may be configured to execute only the authentication processing for checking propriety of the user of the head mounted display without including the online storage function and various other functions. In this case, for example, after the end of step S116 of the authentication processing in the first embodiment (FIG. 6), the transmitting unit of the head mounted display transmits a moving image to the server SV. The track acquiring unit and the authentication processing unit of the server execute step S118 on the basis of the received moving image. After the execution of step S118, the transmitting unit of the server transmits a result of the authentication processing to the head mounted display. Consequently, the head-mounted display device (the head mounted display) only has to include a function of photographing a moving image of at least a part of a visual field direction of the user and a transmitting function. The track acquiring unit of the server acquires a track of a motion of the user from a received moving image. The authentication processing unit of the server authenticates the user using the track. Therefore, even with a head mounted display having a simple configuration, it is possible to reduce a risk of impersonation and realize authentication with further improved security.

Modification 6

In the authentication processing (FIGS. 6 and 10) in the embodiments, the configuration for registering a track of a correct gesture for authentication (track data for authentication) in advance is explained. However, authentication by a handwriting of the user may be performed instead of the authentication by the track of the correct gesture for authentication registered in advance. In this case, handwriting specifying information is stored in the storing unit in advance instead of the track data for authentication. The handwriting specifying information is information used for specifying the handwriting of the user. For example, stroke orders, numbers of strokes, and writing forms of the user concerning representative characters are included.

For example, in the case of the authentication processing shown in FIG. 6, in step S104, the guidance unit causes the input guidance display screen W1 to display, for example, "Please write characters XXX" as the guidance message MGI. Arbitrary characters such as "RINGO in hiragana characters" or "TANAKA in Chinese characters" are inserted in XXX. In step S118, the authentication processing unit causes the track acquiring unit to generate track data on the basis of the acquired moving image of the gesture video. The authentication processing unit compares a handwriting derived from the generated track data and the handwriting specifying information and calculates similarity between the handwriting and the handwriting specifying information. In this way, it is possible to obtain effects same as the effects in the first and second embodiments. If the authentication by the handwriting is performed, since a specific gesture used as a key is absent, it does not occur that the user forgets a gesture for authentication. Therefore, it is possible to improve convenience.

Modification 7

The invention is not limited to the embodiments, the examples, and the modifications explained above and can be realized in various configurations without departing from the spirit of the invention. For example, the technical features in the embodiments, the examples, and the modifications corresponding to the technical features in the aspects described in the summary can be replaced or combined as appropriate in order to solve a part or all of the problems or attain a part or all of the effects. Unless the technical features are explained as essential features in this specification, the technical features can be deleted as appropriate.

What is claimed is:

1. A head-mounted display device that enables a user to simultaneously visually recognize a virtual image and an outside scene, the head-mounted display device comprising:
a camera configured to:
photograph at least a part of a visual field of the user in a state in which the user wears the head-mounted display device: and
acquire a motion of the user, the camera starting photographing of the motion when it detects a preset start trigger, and stopping photographing of the motion when it detects a preset end trigger;
a storage medium configured to store a track for authentication, which is registered in advance by a proper user; and
a processor configured to:
acquire a track of the motion of the user from the motion photographed by the camera:
authenticate, using the acquired track, whether the user is a proper user of the head-mounted display device;
determine that the user is the proper user when similarity between the acquired track and the stored track is equal to or higher than a first threshold; and
determine that the user is not the proper user when similarity between the acquired track and a second track is equal to or higher than a second threshold larger than the first threshold, the second track being obtained by converting a past acquired track,
wherein the start trigger and end trigger are different from the acquired track, and at least one of the start trigger and the end trigger are detection of stillness of the motion of the user for a predetermined time or more.

2. The head-mounted display device according to claim 1, wherein the processor is further configured to:
inform the user of an overlapping region where a display region of the virtual image and a photographing region of the camera overlap, the photographing region being a region, smaller than a total photographing region of the camera, where performance of the camera is assured.

3. The head-mounted display device according to claim 1, wherein at least one of the start trigger and the end trigger is detection of passage of the motion of the user in a predetermined position.

4. The head-mounted display device according to claim 1, wherein at least one of the start trigger and the end trigger is detection of a predetermined shape of a part of a body of the user.

5. The head-mounted display device according to claim 1, wherein the processor is further configured to:
specify the track of the motion according to changes in a moving direction and a movement amount of a part of a body of the user.

6. The head-mounted display device according to claim 5, wherein the processor is further configured to:
set the part of the body of the user as a specific point;
repeatedly acquire a position of the specific point at a predetermined time interval;
calculate, as the moving direction, a direction of a vector imaginarily connecting a position of the specific point acquired in n-th acquisition and a position of the specific point acquired in n+1th acquisition; and
calculate, as the movement amount, magnitude of the vector imaginarily connecting the position of the specific point acquired in the n-th acquisition and the position of the specific point acquired in the n+1th acquisition.

7. The head-mounted display device according to claim 1, wherein the processor is further configured to:
specify the track of the motion according to changes in a moving direction and a movement amount of an arbitrary object held by the user.

8. The head-mounted display device according to claim 7, wherein the processor is further configured to:
set an arbitrary place of the arbitrary object as a specific point;
repeatedly acquire a position of the specific point at a predetermined time interval;
calculate, as the moving direction, a direction of a vector imaginarily connecting a position of the specific point acquired in n-th acquisition and a position of the specific point acquired in n+1th acquisition; and
calculate, as the movement amount, magnitude of the vector imaginarily connecting the position of the specific point acquired in the n-th acquisition and the position of the specific point acquired in the n+1th acquisition.

9. The head-mounted display device according to claim 1, wherein the past acquired track is converted using at least one method among: non-magnification, lateral direction enlargement, longitudinal direction enlargement, lateral direction reduction, and longitudinal direction reduction.

10. A head-mounted display device that enables a user to simultaneously visually recognize a virtual image and an outside scene, the head-mounted display device comprising:
a camera configured to:
photograph at least a part of a visual field of the user in a state in which the user wears the head-mounted display device; and
acquire a motion of the user, the photographing unit starts photographing the motion when it detects a preset start trigger, and stops photographing the motion when it detects a preset end trigger;
a storage medium configured to store a track for authentication, which is registered in advance by the proper user; and
a processor configured to:
acquire a track of the motion of the user from the motion photographed by the camera;
specify the track of the motion according to changes in a moving direction and a movement amount of a part of a body of the user;
authenticate, using the acquired track, whether the user is a proper user of the head-mounted display device;
determine that the user is the proper user when similarity between the acquired track and the stored track is equal to or higher than a first threshold; and
determine that the user is not the proper user when similarity between the acquired track and a second track is equal to or higher than a
second threshold larger than the first threshold, the second track being obtained by converting a past acquired track,
wherein the start trigger and end trigger are different from the acquired track.

11. The head-mounted display device according to claim 10, wherein the processor is further configured to:
inform the user of an overlapping region where a display region of the virtual image and a photographing region of the camera overlap, the photographing region being a region, smaller than a total photographing region of the camera, where performance of the camera is assured.

12. The head-mounted display device according to claim 10, wherein at least one of the start trigger and the end trigger is detection of stillness of the motion of the user for a predetermined time or more.

13. The head-mounted display device according to claim 10, wherein at least one of the start trigger and the end trigger is detection of passage of the motion of the user in a predetermined position.

14. The head-mounted display device according to claim 10, wherein at least one of the start trigger and the end trigger is detection of a predetermined shape of a part of a body of the user.

15. The head-mounted display device according to claim 10, wherein the processor is further configured to:
set the part of the body of the user as a specific point;
repeatedly acquire a position of the specific point at a predetermined time interval;
calculate, as the moving direction, a direction of a vector imaginarily connecting a position of the specific point acquired in n-th acquisition and a position of the specific point acquired in n+1th acquisition; and
calculate, as the movement amount, magnitude of the vector imaginarily connecting the position of the specific point acquired in the n-th acquisition and the position of the specific point acquired in the n+1th acquisition.

16. The head-mounted display device according to claim 10, wherein the past acquired track is converted using at least one method among: non-magnification, lateral direction enlargement, longitudinal direction enlargement, lateral direction reduction, and longitudinal direction reduction.

* * * * *